March 7, 1933. C. A. GRIFFITH 1,900,056
DROP BOTTOM CAR
Filed April 12, 1930 3 Sheets-Sheet 1
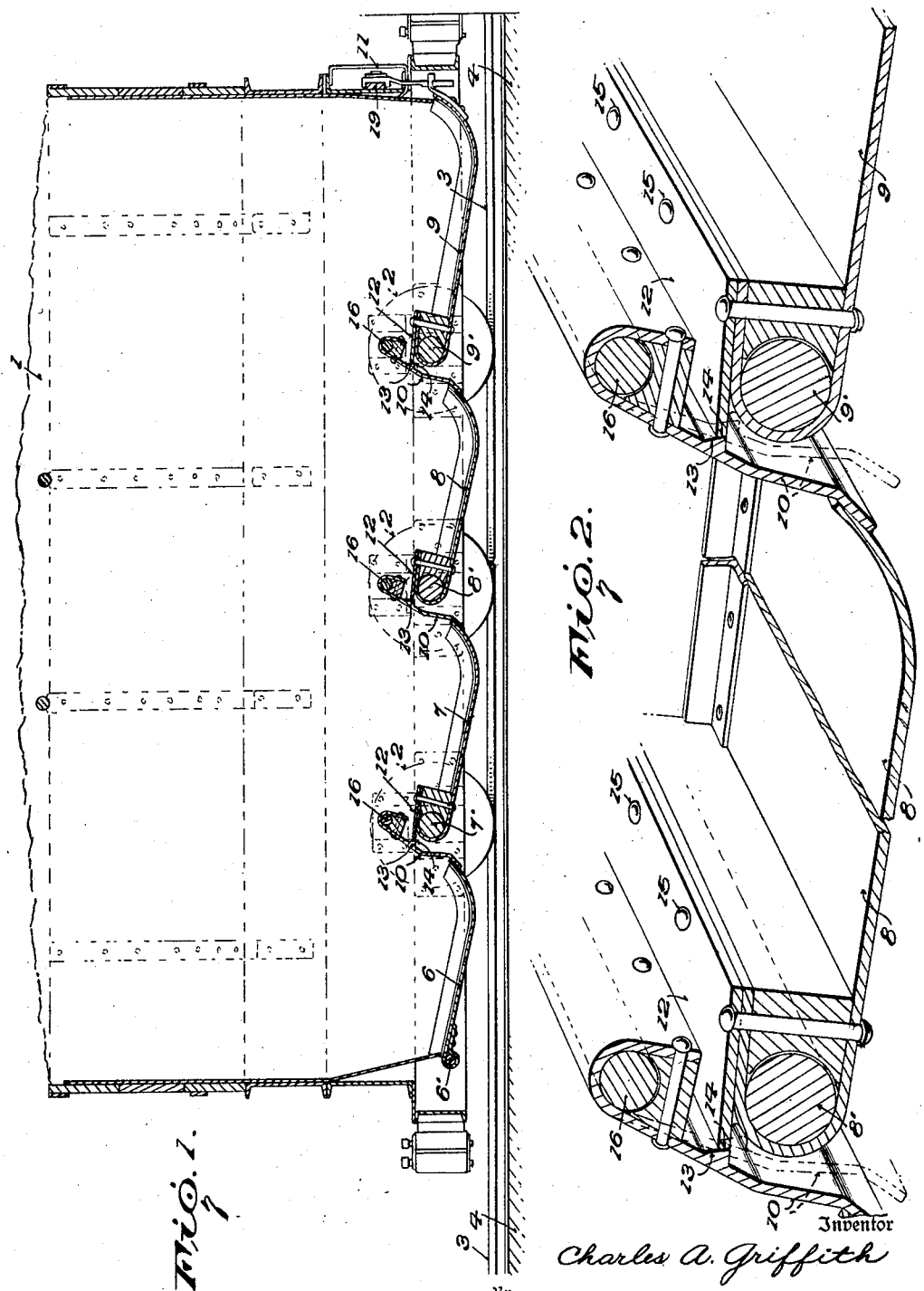
Inventor
Charles A. Griffith
By Cameron, Kerkam & Sutton.
Attorneys March 7, 1933.  C. A. GRIFFITH  1,900,056
DROP BOTTOM CAR
Filed April 12, 1930   3 Sheets-Sheet 2
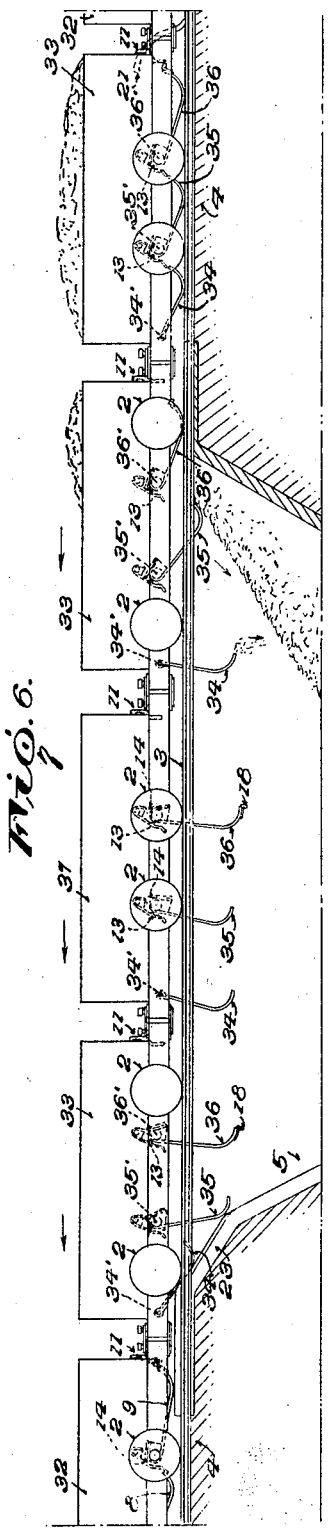
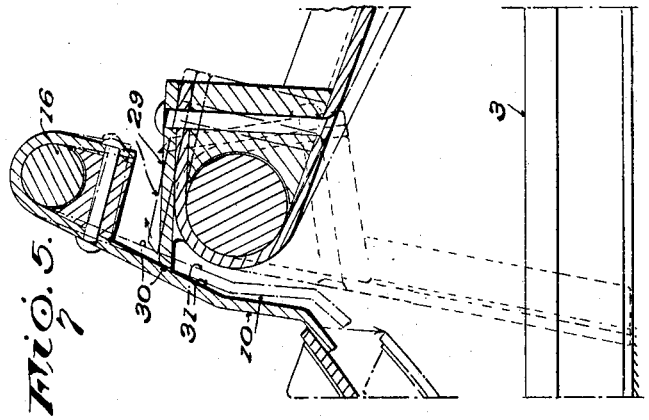
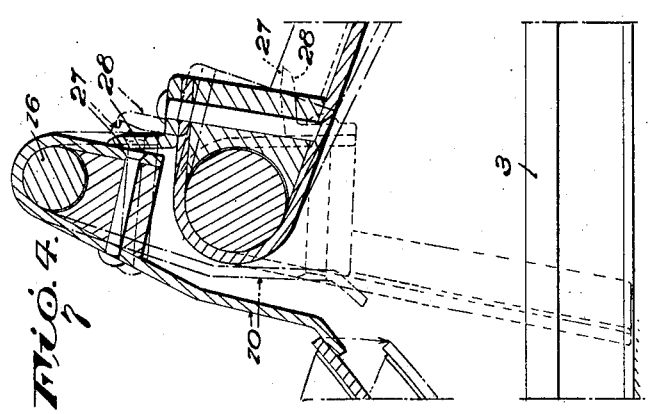
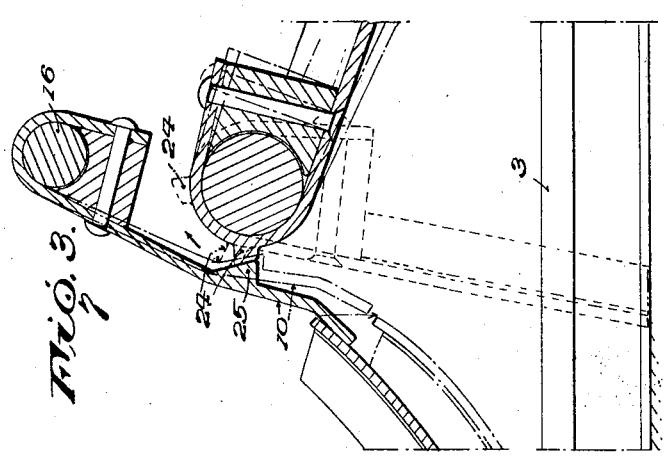
Inventor
Charles A. Griffith.
By
Cameron, Kerkam & Sutton
Attorneys March 7, 1933. C. A. GRIFFITH 1,900,056
DROP BOTTOM CAR
Filed April 12, 1930 3 Sheets-Sheet 3

Inventor
Charles A. Griffith
By Cameron, Kerkam & Sutton
Attorneys

Patented Mar. 7, 1933

1,900,056

UNITED STATES PATENT OFFICE

CHARLES A. GRIFFITH, OF KNOXVILLE, TENNESSEE

DROP BOTTOM CAR

Application filed April 12, 1930. Serial No. 443,854.

This invention relates to drop bottom cars, and more particularly to a car of this type having a series of transversely extending bottom doors which, when in upper or closed positions, sustain the load of material in the car, and which may be automatically tripped to swing downwardly and dump the load through the bottom of the car.

It has heretofore been proposed, as for example, in my U. S. Patent No. 1,268,344, to provide a car having a series of drop bottom doors, wherein the rear door is held in its upper or closed position by a suitable catch and acts to support the next forward or second door which, in turn, acts to support the next forward or third door, and so on through the series of doors on the bottom of the car.

It has further been proposed, as shown in U. S. Patent No. 1,534,135, to provide a car with drop bottom doors, wherein said doors, instead of resting one upon another, as above described, each rest upon a pivoted plate or member independent of the doors and controlled by one of the same to engage said plate or member with and release it from the adjacent door.

In the two forms of cars above referred to, all of the doors, except the rear door, must remain closed until the car arrives in dumping position over a pit or bin under the track, whereupon the rear door is fully opened and the remaining doors are thereafter opened one after another, in order to dump the load of material from the car into said pit or bin. The doors are then closed one after another through engagement with a suitable incline, as the car travels past the forward edge of the pit or bin. It has been found that where the distance between the rear and front edges of the pit or bin is relatively small, the speed of the car must be slow enough to enable all of the doors to open fully and dump the load before the car has passed over said pit or bin. Otherwise, the doors would be closed by engagement with the closing means at the forward edge of the pit or bin, and thus prevent completion of the dumping operation.

In order to enable the car to travel at any desired speed over the pit or bin, and at the same time to insure that the dumping operation will be completed before the doors are closed, it has been proposed to release all of the doors and partially open them before the car reaches the pit or bin, to thereafter fully open the doors one after another from the front to the rear of the car as said doors pass over the rear edge of the pit or bin, and finally to close the doors by engagement of the same one after another with closing means at the forward edge of said pit or bin.

The last mentioned method of releasing and opening the doors is disclosed in U. S. Patent No. 1,607,035, but the doors of the car therein shown must be shifted longitudinally of the car in order to open and close said doors, and in the case of opening the doors, there is the disadvantage not only of having to shift the doors, but also the disadvantage of having to shift the load supported thereby. Moreover, there is the possibility that the character or condition of the load will be such as to interfere with or prevent shifting of the load, or the doors, or both, with the resulting faulty operation of the car at the dumping station. Further, shifting doors require special forms of hinge connections with the car, instead of a simple form of hinge connection such as disclosed in my Patent No. 1,268,344, above referred to, and said doors therefore have the disadvantages of increased manufacturing, installation, maintenance, and replacement costs incident to a more complicated hinge construction.

One object of the present invention is to provide a car having drop bottom doors all of which may be partially opened before the car reaches the pit or bin and without the necessity of shifting said doors or the load carried thereby.

Another object of the present invention is to provide a car having drop bottom doors controlled by independent drop bottom plates or wings in such manner that the doors may all be partially opened before the car reaches the pit or bin.

A further object of the present invention is to provide a car having drop bottom doors and independent locking plates or wings cooperating therewith to effect the release and partial opening of the doors on swinging movement of the latter through relatively small angles.

A still further object of the present invention is to provide a car having drop bottom doors and plates or wings which, by movement of the doors and abutment means thereon through slight angles, may be engaged with and disengaged from certain of the doors to support and release them respectively.

Other objects of the present invention will appear as the following description thereof proceeds, and in order to more clearly understand said invention, reference may be had to the accompanying drawings which illustrate several embodiments of the inventive idea.

In said drawings:

Fig. 1 is a vertical longitudinal sectional view of a car equipped with one embodiment of the present invention;

Fig. 2 is an enlarged perspective view of certain of the doors, drop bottom plates or wings, and inclined plate or wing controlling abutments shown in Fig. 1;

Fig. 3 is an enlarged fragmentary sectional view of another embodiment of the invention, showing in full, dot and dash, and dotted lines, various positions of the parts illustrated;

Fig. 4 is a view similar to Fig. 3, showing another embodiment of the invention;

Fig. 5 is a view similar to Figs. 3 and 4, showing another embodiment of the invention;

Fig. 6 is a side elevation of a train of drop bottom cars of various types equipped with devices embodying the present invention and shown crossing a pit or bin into which material is dumped from the cars;

Figure 7:
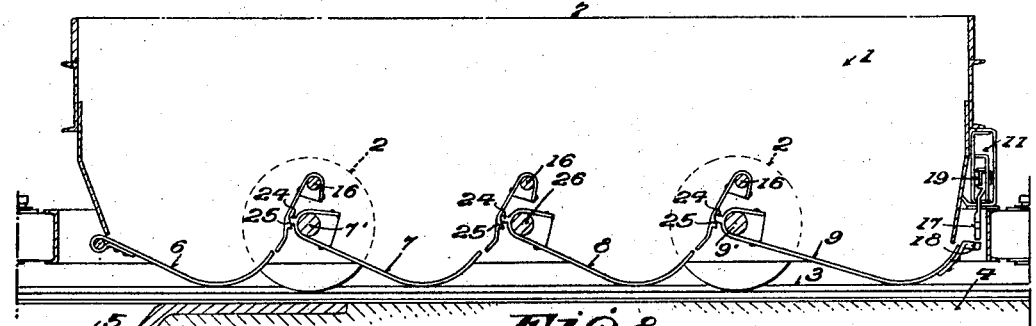
Fig. 7 is a vertical longitudinal sectional view of a car constructed in accordance with the embodiment of the invention illustrated in Fig. 3, and showing the doors all partially opened or dropped downwardly toward the roadbed prior to arrival of the car over the pit or bin.

Referring to the drawings, wherein like reference characters designate like parts throughout the several views, 1 indicates the body of a six wheel car, 2 the car wheels, 3 the track along which the car travels, and 4 the roadbed on which the track is laid. Track 3 extends across a pit or bin 5 into which material is dumped from the car when the drop bottom doors 6, 7, 8, and 9 thereof are opened as hereinafter described.

The doors 6, 7, 8, 9, are hinged on axes 6', 7', 8', 9', extending transversely of the car. In accordance with the present invention, said doors and said axes are prevented from shifting longitudinally of the car, and the doors cooperate with means normally supporting them in upper or closed position but movable to release the doors and enable all of the same to swing downwardly toward the roadbed 4 and partially open before the car arrives over the pit or bin 5. Accordingly, the axis 6' for the door 6 may be comprised by a rod fixed to the car on which said door is pivoted by any suitable hinge device, the axes 7', 8', 9' being comprised, for example, by the axles of the wheels 2 on which the doors 7, 8, 9 are hinged by suitable devices for this purpose. If desired, however, all of said axes may be arranged in a plane or planes other than that of the axles of the wheels 2, and in this case the door axes could be comprised by rods such as indicated at 6' and on which the doors could be mounted to swing up and down by any suitable or well known hinge devices.

As shown in Figs. 1 and 2, the means supporting the doors in upper or closed positions and releasable therefrom to enable all of the doors to drop downwardly toward the roadbed 4 before the car arrives over the pit or bin 5, is comprised by drop bottom plates or wings 10, latch mechanism 11, metal strips 12, and inclined abutments 13 and 14 on the plates 10 and the strips 12, respectively. The strips 12 are riveted or otherwise suitably secured, as at 15, to the several doors adjacent the pivotal axes thereof, and the drop bottom plates or wings 10 are hinged to the car on axes 16 extending transversely of the car above, and in spaced relation with, the axes 7', 8', 9'. The axes 16 are preferably comprised by rods extending transversely of the car and fixed against movement longitudinally thereof.

The shape and inclination of the abutments 13, 14, and the arrangement of the plates 10 and the strips 12 is such that movement of one door and its strip 12 in opposite directions through a very slight angle will engage the corresponding plate 10 with, and enable said plate to be disengaged from, the free edge of the next adjacent door, respectively. It will thus appear that if one door swings downwardly through a small angle toward or onto the roadbed, the strip 12 and abutment 14 will swing upwardly through a slight angle so that said abutment slides upwardly over the abutment 13 of the corresponding plate 10 which thereupon swings through a slight angle out of engagement with the adjacent door and enables it to drop or swing downwardly through a slight angle toward or onto said roadbed. Swinging movement of the last mentioned door, as aforesaid, releases the next adjacent door, as described, enabling it to swing downwardly through a slight angle toward or onto the roadbed 4, and so on through the series of doors until all of them have swung downwardly toward or onto the roadbed before the car arrives over the pit or bin 5.

The doors are preferably released one after another to drop downwardly or onto the roadbed, by first releasing one of the end doors as, for example, the rear door 9. Accordingly, the latch mechanism 11 for this door is operated automatically through motion of the car to release the door 9 and the doors 8, 7, 6, in the order named, before the car arrives over the pit or bin 5. The doors 6, 7, 8, 9, having been partially opened and swung downwardly toward or onto the roadbed 4, before the car arrives over the pit or bin, will dump in the order named as each door passes over the rear edge of said pin or bin, or over any material partially filling the bin and extending up to or near the top thereof. The drop of material from the car to the pit will thus be greatly reduced so that damage to, or breaking of the material is prevented, while at the same time the car may be operated at any desired speed across the pit or bin with assurance that the dumping operation will be completed and that shifting of the doors and load will be unnecessary.

Figure 10:
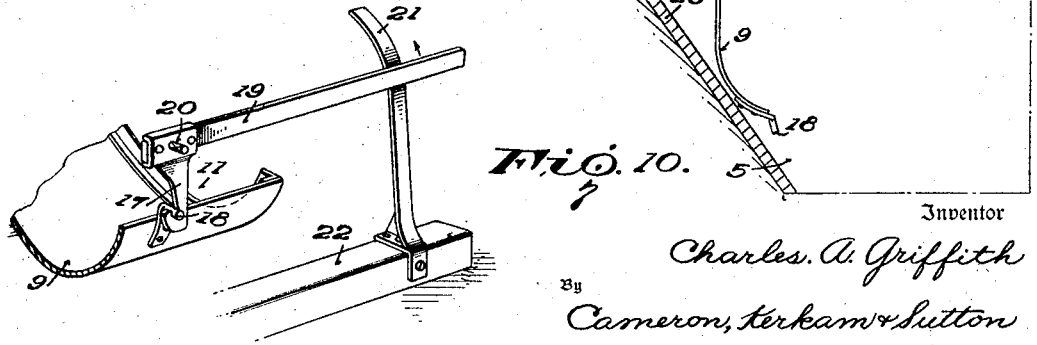
Fig. 10 is an enlarged perspective view of end door latch mechanism and operating means therefor.

The latch mechanism 11 may be of any suitable construction, and as herein shown, said mechanism comprises a hook or catch 17 that engages a lug 18 to hold the door 9 in an upper or closed position. (Fig. 10.) The lug 18 is riveted or otherwise suitably secured on the free edge of the door 9, and the hook 17 is bolted or otherwise suitably secured on a lever 19. The lever 19 is pivoted at 20 on one end of the car and projects outwardly beyond one side of said car for engagement with a cam or incline 21 that is bolted or otherwise suitably secured to a support 22. The cam 21 and support 22 are anchored in any suitable manner to the roadbed 4 at a point rearwardly of the pit or bin 5. As the car travels along the track 3, the lever 19 will engage the cam or incline 21 to swing said lever upwardly about its pivot 20 and disengage the hook 17 from the lug 18. The door 9, and the doors 8, 7, and 6, will then partially open and swing downwardly toward or onto the roadbed 4 before the car arrives over the pit or bin 5.

After the doors have been partially opened in the manner stated, the car reaches the pit or bin 5 and the doors drop one after another into fully opened positions as each door passes over the rear edge of said pit or bin, or over any material partially filling the pit or bin and extending up to or near the top thereof.

Figure 9:
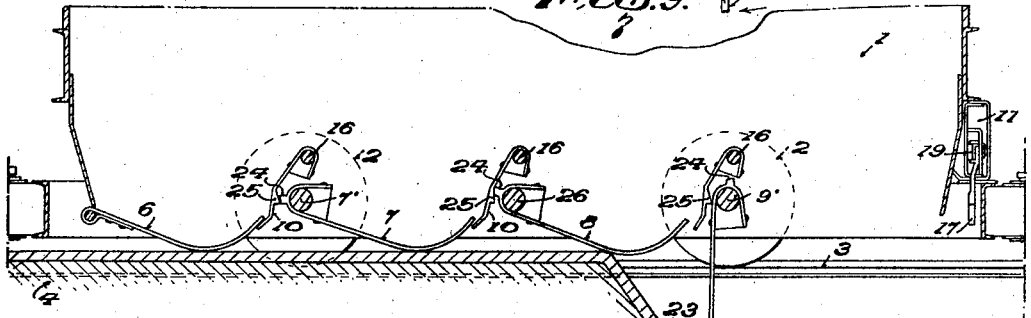
Fig. 9 is a view similar to Figs. 7 and 8, showing the car passing over the forward edge of the pit or bin and the manner of closing the doors one after another.

When the car has been dumped and thereafter passes over the forward edge of the pit or bin, the doors are closed one after another from the front to the rear of the car by engagement of the doors successively with the forward edge of said pit or bin or with other inclined closing means such as indicated at 23 in Figs. 6 and 9 of the drawings. The door closing means raises the door 6 to its upper or closed position and thereafter raises the door 7 to its upper or closed position. When the door 7 is swung upwardly, the abutment 14 thereon slides downwardly over the abutment 13 on the adjacent plate 10 and swings it forwardly so that its free end is engaged under and supports the door 6. The door 8 is closed after the door 7, and the adjacent plate 10 is likewise swung forwardly so that its free edge is engaged under and supports the door 7. The door 9 is next raised to its upper or closed position and the adjacent plate 10 is likewise swung forwardly so that its free edge engages and supports the door 8. When the door 9 is raised to its upper or closed position, it is latched and held in said position through engagement of the lug 18 with the hook 17.

In the embodiment of the invention shown in Figs. 3 and 7 to 9 inclusive, the construction and operation is the same as before described, except that a slightly different form of abutment means is employed. As shown in Figs. 3 and 7 to 9 inclusive, inclined abutments 24 are secured directly to the doors, said abutments being in the form of small lugs or strips the inclined surfaces of which bear against corresponding surfaces of lugs or abutments 25 on the drop bottom plates or wings 10. In the full line positions of the parts shown in Fig. 3, the abutments 24, 25 have been engaged by upward swinging movement of one of the doors to its closed position, and the plate or wing 10 has therefore been swung forwardly to engage and support the next adjacent door in its upper or closed position. In Fig. 7, the doors are shown after they have all been partially opened and dropped downwardly toward the roadbed before arrival of the car over the pit or bin 5. The slight angular movement of the doors enabling the same to thus be dropped downwardly, is apparent upon inspection of the dot and dash line positions thereof indicated in Fig. 3 of the drawings. The relatively increased angular movement of the doors to fully opened position is indicated by the dotted line position of one of said doors and its corresponding abutment 24 (Fig. 3).

Figure 8:
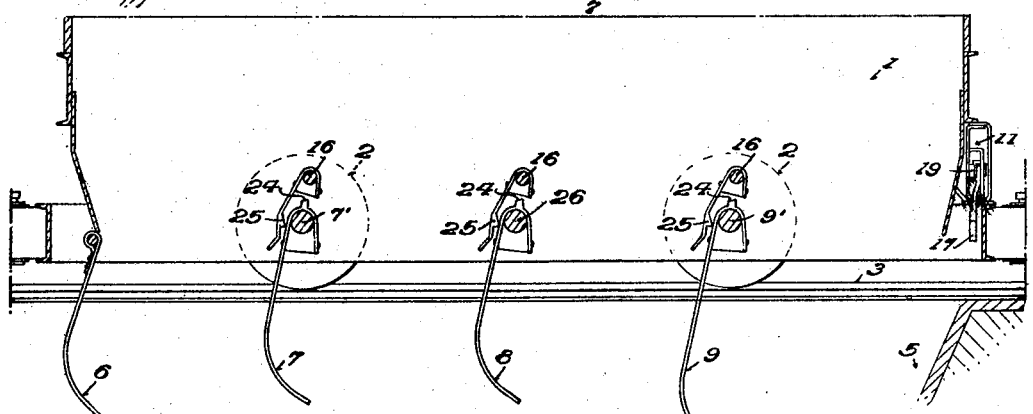
Fig. 8 is a view similar to Fig. 7, showing the car over the pit or bin and doors in fully open position.

The dotted line position of the door shown in Fig. 3 corresponds with the full line positions of the doors shown in Fig. 8, or the positions said doors occupy when they are fully opened one after another as the car travels over the rear edge of the pit or bin. Fig. 8 further shows the positions of the drop bottom plates or wings when the doors are fully opened. Fig. 9 illustrates the manner of closing the doors one after another as the car passes over the forward edge of the pit or bin, or the cam or incline 23, as the case may be. In the last named figure, the door 6 has been raised to its upper or closed position, and this is also true as respects the door 7. The door 7, when raised to its closed position, moves the abutments 24, 25 relatively so that the adjacent plate 10 is engaged under and supports the door 6. The door 8, as shown in Fig. 9, is being moved to its closed position, and as said door is swung upwardly a sufficient distance to bring it to said position, the abutment 24 of the door 8 slides downwardly over the abutment 25 of the adjacent plate 10 and swings it into supporting engagement with the door 7. The door 9, as shown in Fig. 9, has just engaged the cam or incline 23 and will thereafter swing upwardly to fully closed position so that the adjacent wing 10 is engaged under the door 8 to hold it in its upper or closed position. When the door 9 is raised, the lug 18 is engaged by the hook 17 to thereby hold said door in its upper or closed position.

The car shown in Figs. 7 to 9 is of the four wheel type, and the door 8 is mounted on an axis 26 which is independent of the axles of the wheels and extends transversely of the car. The axis 26 is secured to the car in any suitable manner and said axis and door 8 are retained against shifting movement longitudinally of the car, as in the case of the doors 6, 7, 8, 9, shown in Fig. 1 and the doors 6, 7, and 9 shown in Figs. 7 to 9 inclusive.

The embodiment of the invention shown in Fig. 4 has the same construction and operation as those previously described, except that the construction of the abutment means is somewhat different. As shown in Fig. 4, an inclined abutment 27 is formed on an angular strip or bracket 28 that is riveted or otherwise suitably secured to the hinged portion of the door and extends transversely thereof. Bracket 28 is secured to the door rearwardly of the hinged portion of the adjacent wing or plate 10, and when said door is raised, the inclined abutment 27 engages said hinged portion to swing said plate forwardly so that its free edge is moved under and supports the adjacent door. The construction and inclination of the abutment 27 and bracket 28 is such that when the door carrying the same turns in one direction through a small angle about its pivotal axis to drop downwardly toward or onto the roadbed 4, the plate 10 is released from the door engaged thereby so that the latter may swing downwardly toward or onto said roadbed. The positions of the parts illustrated in Fig. 4 when the doors are fully closed and partially opened, are illustrated in full and dot and dash lines, respectively, and the position of one of the doors when fully opened, is indicated in dotted lines.

In the embodiment of the invention shown in Fig. 5, the construction and operation of the parts is substantially the same as those previously described except that a somewhat different form of abutment means is employed. As shown in Fig. 5, one of the doors has riveted or otherwise suitably secured to the hinged portion thereof, a plate 29 provided with an inclined abutment 30 arranged to bear directly on an inclined abutment portion 31 of the drop bottom plate or wing 10. When the abutment 30 and the door carrying the same are swung in a clockwise direction through a slight angle to drop said door downwardly toward or onto the roadbed 4, the plate 10 is disengaged from the adjacent door and the latter drops downwardly toward or upon said roadbed. Said doors are thus partially opened before the car arrives over the pit or bin. After the car has been dumped, and as the doors are raised one after another, as before described, the abutment 30 engages the inclined surface 31 to swing the drop bottom plate or wing 10 under the adjacent door to support it in its upper or closed position. The fully closed and partially opened positions of the doors illustrated in Fig. 5, are shown in full and dot and dash lines, respectively, and the fully opened position of one of the doors is shown in dotted lines.

The invention is not limited in its application to any particular type of car, or to any particular number of doors for the car. Fig. 1 shows a car of one type embodying the invention and equipped with four drop bottom doors. Figs. 7 to 9 inclusive show a car of another type embodying the invention and equipped with four drop bottom doors. Fig. 6 shows a train of cars of various types wherein certain of the cars are provided with three doors, and the doors of all of the cars are controlled by the embodiment of the invention illustrated in Figs. 1 and 2. As shown in Fig. 6, a portion of a six wheel car 32 is therein illustrated and has drop bottom doors 8 and 9 arranged and mounted as shown in Fig. 1. The cars 33, however, are of the four wheel type having three doors 34, 35, 36, mounted on axes 34', 35', 36' extending transversely of the car and retaining the doors against movement longitudinally thereof. The axis 34' is disposed forwardly of the front wheels of the car, and the axes 35', 36' extend between the front and rear wheels of the car. The axes 34', 35', 36', as shown in Fig. 6, are independent of the axles of the car. The car 37 has a front door 34 similar to the front doors of the car 33, and doors 35, 36 which are mounted on the axles of the car instead of between them as in the cars 33.

It will thus appear that cars of various types may be employed and equipped with various embodiments of the present invention, and that said invention is not limited to any particular type of car. Several embodiments of the inventive idea have been described herein with more or less particularity, but it is to be expressly understood that the invention is not limited to said embodiments, or otherwise than by the terms of the appended claims.

What is claimed is:

1. In a drop bottom car, the combination of a plurality of drop bottom doors hinged to axes extending transversely of the body of the car by bending the metal of the door around said axes, drop bottom plates or wings hinged to axes extending transversely of the car above the axes of said doors by bending the metal of said drop bottom plates around their respective axes, said drop bottom plates extending transversely across the car, and a plate secured to the hinged portion of the door and extending transversely across the car and adapted to move the free edges of the drop bottom plates to engage with the free edge of the adjacent door to support said doors in upper or closed position, said plates being movable with the doors through slight angles to release the plates from the doors and to permit them to swing downwardly.

2. In a drop bottom car, the combination of a plurality of drop bottom doors hinged to axes extending transversely of the body of the car by bending the metal of the doors around said axes, drop bottom plates or wings hinged to axes extending transversely of the car above said door axes by bending the metal of said plates around their respective axes, and an angle plate extending transversely across the car and secured to the hinged portion of the respective doors to the rear of the door axes with one arm or member of said angle plates projecting upward to the rear of the hinged portion of said drop bottom plates and adapted to engage said hinged portion of said plates to move the plates to engage with the free edge of the respective doors to support them in upper or closed position, said angle plates being movable with said doors through slight angles to release the drop bottom plates from the doors and enable them to swing downwardly.

3. In a drop bottom car, the combination of a plurality of drop bottom doors hinged to axes extending transversely of the body of the car by bending the metal of said doors around said axes, drop bottom plates or wings hinged to axes extending transversely across the car above the door axes, said plates being hinged to their respective axes by bending the metal of the plates around said axes, each door having a plate secured to the upper hinged portion thereof and extending transversely across the car, each of said plates being provided with an arm engaging the rear portion of the respective drop bottom plates to move said plates into supporting position with relation to the free edge of the respective doors to support the same in closed position, said plates being movable with said doors through slight angles to release the drop bottom plates from the doors and permit them to swing downwardly.

In testimony whereof I have signed this specification.

CHARLES A. GRIFFITH.